United States Patent
Haukli et al.

(10) Patent No.: US 10,586,040 B2
(45) Date of Patent: Mar. 10, 2020

(54) SAMPLE-SPECIFIC SANDBOX CONFIGURATION BASED ON ENDPOINT TELEMETRY

(71) Applicant: CA, Inc., San Jose, CA (US)

(72) Inventors: Lars Haukli, Oslo (NO); Felix Leder, TayrnAysen (NO); Kevin Roundy, El Segundo, CA (US)

(73) Assignee: CA, Inc., San Jose, CA (US)

( * ) Notice: Subject to any disclaimer, the term of this patent is extended or adjusted under 35 U.S.C. 154(b) by 142 days.

(21) Appl. No.: 15/468,636

(22) Filed: Mar. 24, 2017

(65) Prior Publication Data

US 2018/0276371 A1 Sep. 27, 2018

(51) Int. Cl.
*G06F 21/53* (2013.01)
*G06F 21/56* (2013.01)
*H04L 29/06* (2006.01)

(52) U.S. Cl.
CPC ............ *G06F 21/53* (2013.01); *G06F 21/566* (2013.01); *H04L 63/145* (2013.01); *G06F 2221/033* (2013.01)

(58) Field of Classification Search
CPC .. G06F 21/53; G06F 21/566; G06F 2221/033; H04L 63/145
USPC ......................................................... 726/23
See application file for complete search history.

(56) References Cited

U.S. PATENT DOCUMENTS 9,223,972 B1 12/2015 Vincent et al.
9,571,512 B2 * 2/2017 Ray ................... H04L 63/1425
2014/0047544 A1 2/2014 Jakobsson
2015/0096022 A1 4/2015 Vincent et al.
2017/0083703 A1 * 3/2017 Abbasi ................ G06F 21/566
2017/0251002 A1 * 8/2017 Rostamabadi ...... H04L 63/1425
2017/0251003 A1 * 8/2017 Rostami-Hesarsorkh ................... H04L 63/1425
2018/0048660 A1 * 2/2018 Paithane ............. G06F 21/6218

OTHER PUBLICATIONS

International Search Report, PCT/US18/23587, dated May 22, 2018.
http://vmcloak.readthedocs.io/en/latest/config.html; 2014-2015, Jurriaan Bremer.
https://www.safaribooksonline.com/library/view/cuckoo-malware-analysis/9781782169239/ch05.html; 2017, by Iqbal Muhardianto and Digit Oktavianto.
https://www.proteansec.com/linux/installing-using-cuckoo-malware-analysis-sandbox/; Feb. 10, 2015, by Dejan Lukan.
https://infosecspeakeasy.org/t/howto-build-a-cuckoo-sandbox/27; Aug. 2015, by Sean Whalen.
https://bto.bluecoat.com/sites/default/files/tech_pubs/MAA_4.2.8_iVM_Profile_Customization_Guide_0.pdf; Apr. 27, 2016, Blue Coat Systems, Inc.

(Continued)

*Primary Examiner* — Teshome Hailu
*Assistant Examiner* — Benjamin A Kaplan
(74) *Attorney, Agent, or Firm* — Maschoff Brennan

(57) ABSTRACT

A method for determining sandbox configurations for malware analysis is described. In one embodiment, the method may include receiving a plurality of files, extracting at least one element from at least one file from the plurality of files, identifying one or more properties associated with an endpoint, determining a correlation between the at least one extracted element and the one or more properties of the endpoint, and determining one or more sandbox configurations based at least in part on the determined correlation. In some cases, the endpoint is related to at least one of the plurality of files.

20 Claims, 12 Drawing Sheets

(56) References Cited

OTHER PUBLICATIONS https://github.com/a0rtega/pafish, https://Iup.Iub.Iu.se/studentpapers/search/publication/8880576; 2017, GitHub, Inc., Alberto Ortega.
https://www.botconf.eu/wp.../OK-S02-Zoltan-Balazs-Sandbox_mapping_botconf.pdf; 2015, Zoltan Balazs.

* cited by examiner

SAMPLE-SPECIFIC SANDBOX CONFIGURATION BASED ON ENDPOINT TELEMETRY

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection. A sandbox is a virtual space in which new or untested software can be run securely. Although sandbox configuration is common, there is no one-size-fits-all configuration that will allow all files to run, particularly targeted files, that require a special environment to run.

SUMMARY

According to at least one embodiment, a method for determining sandbox configurations for malware analysis, is described. In one embodiment, the method may include: receiving a plurality of files, extracting at least one element from at least one file from the plurality of files, identifying one or more properties associated with an endpoint, determining a correlation between the at least one extracted element and the one or more properties of the endpoint, and determining one or more sandbox configurations based at least in part on the determined correlation. In some cases, the endpoint may be related to at least one of the plurality of files.

In some cases, the method may include identifying a successful execution in relation to at least one of the plurality of files on the endpoint, and identifying the one or more properties associated with the endpoint based at least in part on the successful execution. In some cases, the method may include using the at least one extracted element as a classification feature for classifying the plurality of files.

In some embodiments, the method may include receiving a new file, extracting one or more elements from the new file, and performing a security action based on analysis of the one or more extracted elements. In some examples, performing the security action may include identifying among the one or more sandbox configurations a sandbox configuration for the new file. In some cases, the sandbox configuration for the new file is based at least in part on a pre-determined correlation.

In some embodiments, the method may include identifying a classification of the one or more extracted elements, and identifying the pre-determined correlation based at least in part on the identified classification. In some embodiments, the method may include determining whether the new file reveals a predefined minimum behavior when executed in the identified sandbox configuration, and in response to determining that the new file reveals the predefined minimum behavior when executed in the identified sandbox configuration, increasing a confidence score associated with the pre-determined correlation.

In some embodiments, the method may include in response to determining that the new file fails to reveal the predefined minimum behavior when executed in the identified sandbox configuration, decreasing a confidence score associated with the pre-determined correlation.

In some embodiments, the method may include receiving a new file, extracting one or more elements from the new file, and determining whether the one or more elements extracted from the new file correlate with at least one of a plurality of clusters.

In some embodiments, in response to determining that the one or more extracted elements does not correlate with the plurality of clusters, the method may include generating a cluster that includes the new file, the cluster being generated based at least in part on the one or more elements extracted from the new file, and identifying the one or more properties associated with the endpoint. In some cases, the new file may reveal a predefined minimum behavior when executed on the endpoint.

In some embodiments, the method may include adding the generated cluster to the plurality of clusters, and updating a correlation between the plurality of clusters and the one or more properties of the endpoint. In some embodiments, in response to determining that the one or more extracted elements correlates with the plurality of clusters, the method may include identifying a pre-existing cluster associated with the new file, identifying a pre-determined correlation based at least in part on the pre-existing cluster, and identifying among the one or more sandbox configurations a sandbox configuration for the new file. In some cases, the sandbox configuration for the new file is based at least in part on the pre-determined correlation.

In some embodiments, the method may include parsing each file in the plurality of files to identify the at least one element from each file. In some cases, the one or more properties associated with the endpoint includes at least one of one or more processors, an operating system, a version associated with the operating system, a memory, a file system, device attributes, locale, geographic information, an input, a number of executing processes, details associated with the executing processes, a software installed on the endpoint, or a combination thereof.

A computing device configured for determining sandbox configurations for malware analysis is also described. The computing device may include one or more processors and memory in electronic communication with the one or more processors. The memory may store computer executable instructions that when executed by the one or more processors cause the one or more processors to receive a plurality of files, extract at least one element from at least one file from the plurality of files, identify one or more properties associated with an endpoint, determine a correlation between the at least one extracted element and the one or more properties of the endpoint, and determine one or more sandbox configurations based at least in part on the determined correlation. In some cases, the endpoint may be related to at least one of the plurality of files.

A non-transitory computer-readable storage medium storing computer executable instructions is also described. When the instructions are executed by one or more processors, the execution of the instructions may cause the one or more processors to receive a plurality of files, extract at least one element from at least one file from the plurality of files, identify one or more properties associated with an endpoint, determine a correlation between the at least one extracted element and the one or more properties of the endpoint, and determine one or more sandbox configurations based at least in part on the determined correlation. In some cases, the endpoint may be related to at least one of the plurality of files. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
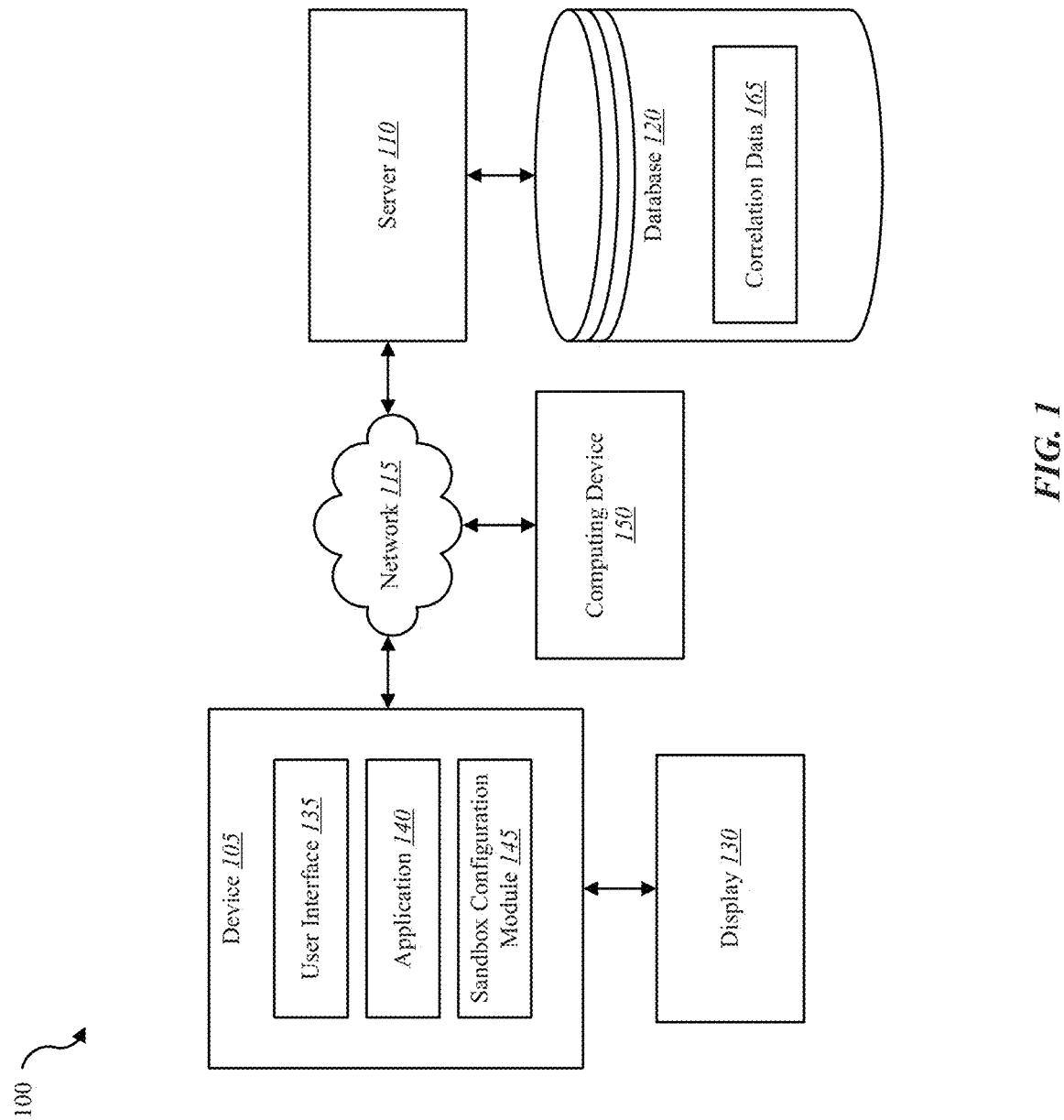
FIG. 1 is a block diagram illustrating one embodiment of an environment in which the present systems and methods may be implemented in accordance with various aspects of this disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE INVENTION

The systems and methods described herein relate to generating sample-specific sandbox configuration. More specifically, the systems and methods described herein relate to using machine learning techniques on a training set of files to classify the files into malicious and non-malicious files. The training set of files may include both malicious files as well as non-malicious files. In some cases, machine learning techniques using language processing may be used for determining a successful sandbox configuration. In some examples, clustering algorithms may be used to generate malicious file clusters and non-malicious file clusters. In some examples, the training set of files may be clustered into groups that perform well in similar environments.

The method generating sample-specific sandbox configurations may include two stages: a training stage and a prediction stage. During the training stage, the system is provided with a training set of files. For example, the training set of files may include both malicious files and non-malicious files. In some embodiments, the system may be a remote processor configured to classify malicious and non-malicious files. In some cases, the remote processor may receive the training set of files from a second remote processor, a server, a computing device, or a combination thereof. Each file in the training set of files may be examined to extract at least one element from each file in the training set of files. The elements may be extracted from each file using methods similar to those used by an anti-virus software. In some examples, the extracted elements may include metadata from the received files.

Once the elements are extracted, the system may be configured to analyze each of the extracted elements and generate positive analysis results if an element is associated with a non-malicious file and negative analysis results if the element is associated with a malicious file. In some cases, a difference in behavior may be observed between two or more files. As part of the analysis, in some examples, the system may be configured to identify indication of successful detonation of the malicious file, at an endpoint. In some examples, upon receiving the indication, the system may identify one or more properties of the endpoint. For example, the system may identify endpoint configurations. The system may further identify endpoint environments that describes details of the endpoint on which a file was executed. The details may include RRSLog data, that provides details about the software that was installed on the machine at the time that a BASH behavior for the machine was observed. The properties of endpoint may further include behavioral information/data, that may provide a fine-grained information about native systems at the time that the execution of the malicious file occurred. Such fine grained information may include whether there was active keyboard, mouse input, number of executing processes, and details about the executing processes.

Upon identifying the properties of the endpoints, the system may determine a correlation between the properties and the extracted elements. As an example, the system may identify a correlation between properties of a malware file itself and properties of the execution environment of that malware file. The system may then identify a sandbox configuration based at least in part on identifying the correlation. That is, the system may identify a set of properties, that when possessed by a sandbox, the sandbox may be used to detonate a type of file.

During the prediction stage, when a new file is received, one or more elements are identified from the new file. In some example, the system may determine elements and identifiers from the new file using methods described above. The system may then identify a pre-existing correlation associated with the elements of the new file from the correlations determined during the training stage. Upon determining the pre-determined correlation, the system may identify one or more properties of a sandbox. The identified sandbox may possess the same properties as an endpoint used to detonate similar malicious file. As explained above, the system may determine details associated with endpoints, on which a similar malicious file had successfully executed during the training stage. During the prediction stage, the system may determine the sandbox configuration to include properties similar to the endpoint. Thus, for a new file, the system may be configured to automatically derive sandbox properties that will increase the chances of extracting its malicious behavior.

FIG. 1 is a block diagram illustrating one embodiment of an environment 100 in which the present systems and methods may be implemented in accordance with various aspects of this disclosure. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of mobile devices, smart phones, personal computing devices, computers, laptops, desktops, servers, media content set top boxes, digital video recorders (DVRs), or any combination thereof. Examples of computing device 150 may include any combination of a mobile computing device, a laptop, a desktop, a server, a media set top box, or any combination thereof. Examples of server 110 may include a data server, a cloud server, a server associated with a security solution provider, proxy server, mail server, web server, application server, database server, communications server, file server, home server, mobile server, name server, or any combination thereof.

In some configurations, the device 105 may include a user interface 135, application 140, and sandbox configuration module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, sandbox configuration module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a sandbox configuration module 145. For example, device 105 may include application 140 that enables device 105 to interface with a user via sandbox configuration module 145 located on another device such as computing device 150 and/or server 110. In some embodiments, device 105 and server 110 may include a sandbox configuration module 145 where at least a portion of the functions of sandbox configuration module 145 are performed separately and/or concurrently on device 105 and/or server 110. Likewise, in some embodiments, a user may access the functions of device 105 (directly or through device 105 via sandbox configuration module 145) from computing device 150. For example, in some embodiments, computing device 150 includes a mobile application that interfaces with one or more functions of device 105, sandbox configuration module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include correlation data 165. For example, device 105 may access identifier data in database 120 over network 115 via server 110. Correlation data 165 may include data related to correlation between extracted elements and one or more properties of an endpoint. In some embodiments, sandbox configuration module 145 may be configured to perform the systems and methods described herein in conjunction with user interface 135, application 140, and/or correlation data 165. User interface 135 may enable a user to interact with, control, and/or program one or more functions of sandbox configuration module 145. Further details regarding the sandbox configuration module 145 are discussed below.

Figure 2:
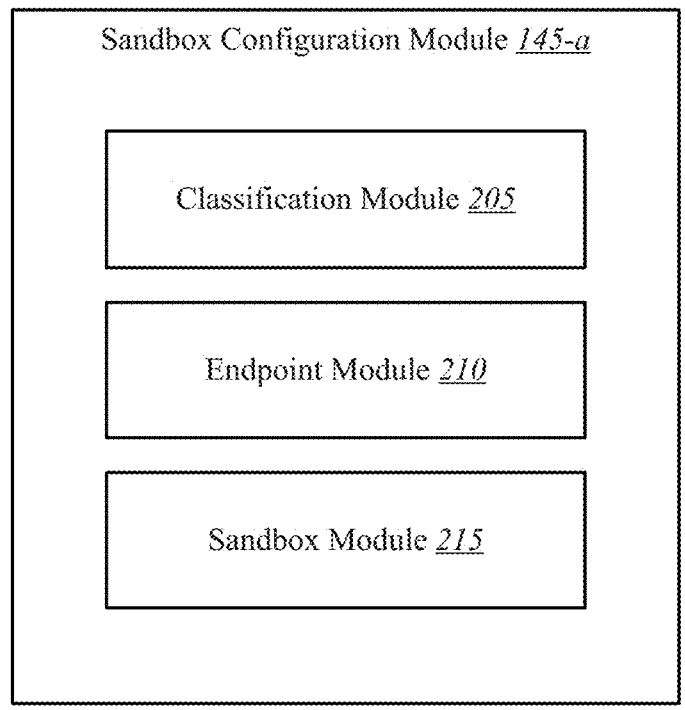
FIG. 2 is a block diagram illustrating one example of a sandbox configuration module in accordance with various aspects of this disclosure.

FIG. 2 is a block diagram illustrating one example of a sandbox configuration module in accordance with various aspects of this disclosure. Sandbox configuration module 145-*a* may be one example of sandbox configuration module 145 depicted in FIG. 1. As depicted, sandbox configuration module 145-*a* may include classification module 205, endpoint module 210, and sandbox module 215.

In one embodiment, the sandbox configuration module 145-*a* may be configured to determine a correlation between the at least one extracted element and the one or more properties of the endpoint. In some embodiments, the sandbox configuration module 145-*a* may be configured to determine one or more sandbox configurations based at least in part on the determined correlation.

In one embodiment, classification module 205 may be configured to receive a plurality of files. For example, the classification module 205 may be configured to receive a first set of files during a training stage. In some embodiments, the classification module 205 may be configured to receive a first plurality of files during a training stage and a second plurality of files during a prediction stage. In some examples, the classification module may receive executable files and exploit documents as the plurality of files. In some embodiments, the classification module 205 may be configured to extract at least one element from at least one file from the plurality of files. In some examples, the extracted element is metadata associated with the received files. For example, the extracted element can be at least one of a plurality of text elements, details about data included in the received files, a plurality of images included in the received files, or a combination thereof.

In some embodiments, the classification module 205 may be configured to identify one or more identifiers associated with each file. In some examples, the classification module may identify the identifiers based at least in part on the extracted elements. For example, the classification module 205 may receive a file and may extract a number of elements from the file. From the extracted elements, the classification module 205 determine a number of elements associated with malicious files and a number of elements associated with non-malicious files. The classification module 205 may be configured to generate the identifiers from the identified elements. In some examples, the identifiers are signatures describing a particular set of elements observed in each file.

In some examples, the classification module 205 may be configured to generate a number of clusters of files, with at least one file per cluster. In some cases, generating the clusters of files is accomplished as a part of a training stage. In some embodiments, the classification module 205 may be configured to classify at least one file as being malicious. In some examples, a first cluster may be a cluster of evasive malware and a second cluster may be a cluster of exploits.

In some embodiments, the classification module 205 may be configured to receive a new file and extract one or more elements from the new file. In some examples, the classification module 205 may determine one or more identifiers from the extracted elements. In some examples, the classification module 205 may determine one or more identifiers associated with the new file by comparing the determined identifier with the identifier data stored in the database 120 (not shown), as described with reference to FIG. 1. In some embodiments, the classification module 205 may be configured to identify a pre-existing cluster from a group of clusters. In some examples, the classification module 205 may determine whether the one or more elements extracted from the new file correlate with at least one of a plurality of clusters. For example, the classification module 205 may generate the plurality of clusters as part of the training stage and store the plurality of clusters in database 120. In some cases, the classification module 205 may determine the pre-existing cluster from the plurality of clusters generated during the training stage. In some cases, the classification module 205 may communicate with cluster data stored in database 120 to determine if there is a pre-existing cluster associated with the extracted elements for the new file. In some embodiments, the classification module 205 may receive a new file from the computing device 150 as described with reference to FIG. 1.

In one embodiment, the endpoint module 210 may be configured to identify one or more properties associated with an endpoint. In some example, the endpoint may be related to at least one of the plurality of files. In some examples, the endpoint may be real endpoints in relation to which the file was observed. In some examples, the endpoint module 210 may identify properties of an endpoint upon determining that a malicious file was identified on the machine, or was observed being sent to or from the machine. In some examples, the endpoint module 210 may determine that the file displayed malicious behavior, indicating that the endpoint environment satisfied the properties necessary for the file (e.g., malware) to activate. In some examples, the one or more properties associated with the endpoint includes at least one of one or more processors, an operating system, a version associated with the operating system, a memory, a file system, device attributes, locale, geographic information, an input, a number of executing processes, details associated with the executing processes, a software installed on the endpoint, or a combination thereof.

In one embodiment, endpoint module 210 may be configured to determine a correlation between the at least one extracted element and the one or more properties of the endpoint. In some examples, upon receiving a new file, the endpoint module 210 may be configured to identify a pre-determined correlation based at least in part on the identified classification of the received file. As an example, for a file element corresponding to the existence of Japanese-characters in a file, the endpoint module 210 may observe that a correlation exists between files with these characters and machines with the property of having Japanese language packs installed. In some examples, the endpoint module 210 may determine the correlation during a prediction stage. In some embodiments, the endpoint module 210 may store the determined correlation in correlation data 165 in database 120. In some examples, the endpoint module 210 may identify the one or more properties associated with the endpoint. In some cases, the new file may reveal a predefined minimum behavior when executed on the endpoint. In some embodiments, the endpoint module 210 may be configured to update a correlation between a plurality of clusters (e.g., clusters generated using elements extracted from the received file) and the one or more properties of the endpoint.

In one embodiments, sandbox module 215 may be configured to determine one or more sandbox configurations based at least in part on the determined correlation. For example, the sandbox module 215 may determine a configuration where one or more files with similar properties, will detonate. In some examples, the sandbox module 215 may perform a security action based on analysis of the one or more extracted elements. In some examples, performing the security action may include identifying among the one or more sandbox configurations, a sandbox configuration for the new file. In some cases, the sandbox configuration is based at least in part on a pre-determined correlation. Upon receiving a new file, the sandbox module 215 may identify a sandbox configuration. The sandbox module 215 may determine whether the new file reveals a predefined minimum behavior when executed in the identified sandbox configuration. In some examples, in response to determining that the new file reveals the predefined minimum behavior when executed in the identified sandbox configuration, the sandbox module 215 may be configured to increase a confidence score associated with the pre-determined correlation. In some embodiments, in response to determining that the new file fails to reveal the predefined minimum behavior when executed in the identified sandbox configuration, the sandbox module 215 may decrease a confidence score associated with the pre-determined correlation. In some examples, the confidence scores may be adjusted during the prediction stage. For example, the sandbox module 215 may generate an initial confidence score during a training stage. The sandbox module 215 may receive a correlation between one or more extracted elements and properties of an endpoint. Based on the correlation, (e.g., how strong the correlation is) the sandbox module 215 may determine an initial score associated with the correlation.

Figure 3:
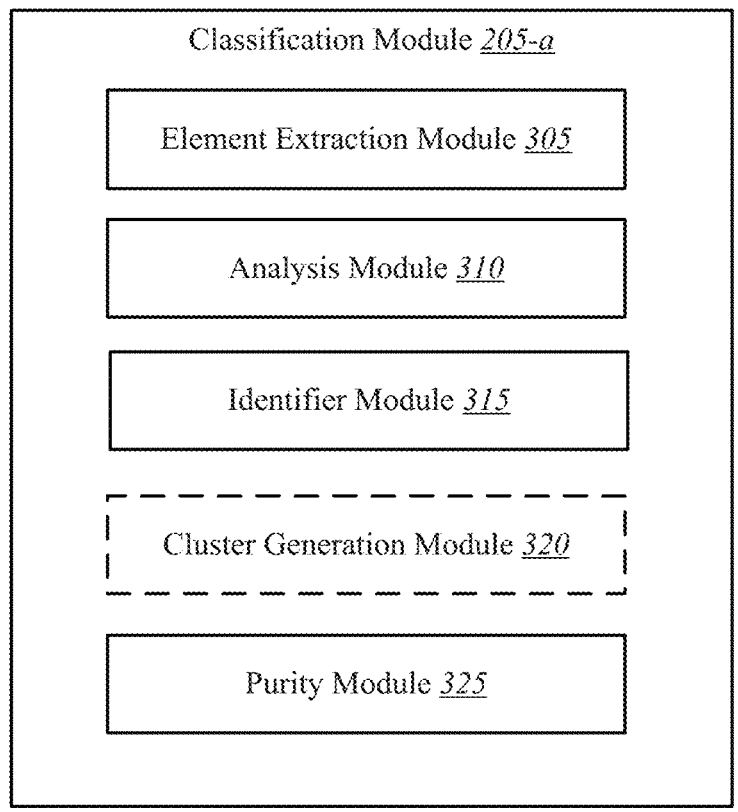
FIG. 3 is a block diagram illustrating one example of a classification module in accordance with various aspects of this disclosure.

FIG. 3 is a block diagram illustrating one example of a classification module 205-a. Classification module 205-a may be one example of classification module 205 depicted in FIG. 2. As depicted, classification module 205-a may include element extraction module 305, analysis module 310, identifier module 315, cluster generation module 320, and purity module 325.

In one embodiment, element extraction module 305 may be configured to receive a plurality of files. For example, the element extraction module 305 may receive a first plurality of files during a training stage and a second plurality of files during a prediction stage. In some examples, the first plurality of files may be a training set of files. In some embodiments, the element extraction module 305 may receive a number of malicious and non-malicious files. In some examples, the received files may be used for generating a plurality of clusters of malicious files and non-malicious files, respectively, using machine learning techniques during the training stage. In some embodiments, the element extraction module 305 may be configured to extract at least one element from at least one file from the plurality of files. For example, the element extraction module 305 may parse each file in the plurality of files to identify the at least one element from each file. The extracted element can be at least one of a plurality of text elements, details about data included in the received files, a plurality of images included in the received files, or a combination thereof.

In one embodiment, the element extraction module 305 may be configured to receive a new file. For example, the element extraction module 305 may receive the new file during the prediction stage. In some embodiments, the element extraction module 305 may be configured to extract one or more elements from the new file. For example, the element extraction module 305 may parse the new file to identify the at least one element from each file.

In one embodiment, analysis module 310 may be configured to analyze the extracted elements from each file. For example, each file may consist of different elements which are analyzed for maliciousness i.e., each file may be analyzed to determine if there exists an element which may be used to steal sensitive information from the recipient of the file or from an endpoint where the file is executed. An example of a malicious file may be a .exe file. When executed, the malicious .exe file may be able to access personal information of the recipient stored on the endpoint at which the file was received. In some cases, the analysis module 310 analyses each element for maliciousness. These elements can be at least one of a plurality of text elements, a plurality of email attachments, a plurality of zip files, a plurality of images, are a combination thereof. In some embodiments, the analysis module 310 may be configured to analyze the one or more extracted elements based on a number of pre-determined criteria. For example, the pre-determined criteria may be identifying a .exe file, identifying an evasive malware, identifying one or more exploits, or a combination thereof.

In some embodiments, the analysis module 310 may be configured to generate a number of positive analysis detections associated with a first plurality of extracted elements. For example, the analysis module 310 may determine that a particular type of element is detected as positive, i.e., the particular type of element is related to non-malicious files. In some other embodiments, the analysis module 310 may be configured to generate a number of negative analysis detections associated with a second plurality of extracted elements. For example, the analysis module 310 may determine that a particular type of element is detected as negative, i.e., the particular type of element is related to malicious files. In some embodiments, the analysis module 310 may be configured to analyze the extracted elements using methods similar to methods used by an anti-virus software.

In one embodiment, identifier module 315 may be configured to identify a plurality of identifiers based on each file in the first plurality of files. For example, the first plurality of files may be the training set of files, as described with reference to FIG. 2. In some cases, the identifier module 315 may be configured to identify the plurality of identifiers based on at least one element. For example, when the identified elements from a file include plurality of text elements, the identifiers associated with the extracted elements may be described as suspicious characters found in the text. In another example, when the identified elements from a file include plurality of email attachments, the identifiers associated with the extracted elements may be described as an executable file is detected in the email. In another example, when the identified elements from a file include foreign characters, the identifiers associated with the extracted element may describe the foreign language. For example, for a text file including the existence of Japanese-characters, English-characters, and numeric-characters, the identifiers may include an identifier relating to Japanese language. In some examples, in case of a plurality of zip files, the identifiers associated with the extracted elements may be described as the type of file (zip in this example). Additionally or alternatively, the identifier module 315 may be configured to receive the analysis of the extracted elements from the analysis module 310. In some examples, the identifier module 315 may receive positive and negative analysis results associated with the extracted elements. In some embodiments the identifier module 315 may be configured to generate a representation of an identifier associated with a file, as a simplistic representation of the elements extracted from the file.

In some embodiments, the identifier module 315 may determine a positive identifier associated with a non-malicious file and a negative identifier associated with a malicious file. In some examples, each file may be associated with a single identifier. In some examples, each file may be associated with a plurality of identifiers. In some embodiments, the identifier module 315 may be configured to determine duplicate identifiers associated with a single file. The identifier module 315 may then identify only unique identifiers associated with the file. In some embodiments, the identifier module 315 may be configured to determine a number of weighted duplicate identifiers associated with a single file. For example, the identifier module 315 may determine a frequency of each identifier within the file, i.e., the identifier module 315 may be configured to determine a number of times an identifier has been used in a particular file. The identifier module 315 may then generate a plurality of weighted identifiers based on the frequency associated with each identifier. In some embodiments, the identifier module 315 may be configured to send the identifiers for storage in database 120, as described with reference to FIG. 1.

In one embodiment, cluster generation module 320 may optionally be configured to determine a number of malicious files associated with a first identifier. As explained above, the identifier module 315 may generate a plurality of identifiers associated with a plurality of files. In some examples, cluster generation module 320 may be configured to determine a number of malicious files based at least in part of a number of extracted elements and on determining whether the extracted elements are positive or negative.

In some examples, the cluster generation module 320 may be configured to use at least one extracted element as a classification feature for classifying the plurality of files. As an example, the cluster generation module 320 may use any well-known classification technique to generate a classification of the plurality of files. In one case, the cluster generation module 320 may be configured to classify the received plurality of files into malicious files and non-malicious files.

In some examples, the cluster generation module 320 may receive identifiers from the identifier module 315. In some embodiments, the cluster generation module 320 may be configured to determine a significance level associated with the first identifier based on the number of malicious files. For example, the cluster generation module 320 may receive an identifier analyzed as negative from the identifier module 315. In some embodiments, the cluster generation module 320 may be configured to determine the files associated with the negative identifier. In some embodiments, the cluster generation module 320 may be configured to determine a number of malicious files associated with the negative identifier. In some examples, the cluster generation module 320 may determine that the negative identifier is associated with both a first plurality of malicious files and a second plurality of non-malicious files. In some embodiments, the negative identifier may only be associated with malicious files. In some examples, the cluster generation module 320 may be configured to identify the significance level of an identifier, based on a difference between the number of malicious files associated with the identifier and a number of non-malicious files associated with the identifier.

In one embodiment, cluster generation module 320 may be configured to use a plurality of extracted elements as classification features for generating a first cluster of files and a second cluster of files. In one embodiment, the first cluster of files may be a cluster of malicious files and the second cluster of files may be a cluster of non-malicious files. Additionally, or alternatively, the cluster generation module 320 may receive one or more identifiers from the identifier module 315. In some embodiments, the cluster generation module 320 may be configured to use the significant identifiers as features for generating the clusters. For example, the cluster generation module 320 may use only those identifiers which have a significance level satisfying a significance threshold. In some embodiments, the cluster generation module 320 may be configured to use the extracted elements as features in any classification algorithm. In some examples, the cluster generation module 320 may be configured to use metadata extracted from the received files, as classification features.

In one embodiment, cluster generation module 320 may be configured to generate a plurality of clusters that include at least one file per cluster. In some cases, the cluster generation module 320 may generate the plurality of clusters using a training set of files received during a training stage. Accordingly, in some cases, the plurality of clusters may include a first cluster of files and a second cluster of files. For example, the first cluster of files and the second cluster of files may include one or more files from the training set of files received during the training stage. In some embodiments, the cluster generation module 320 may be configured to generate a first cluster relating to malicious files, and a second cluster relating to non-malicious files. In some embodiments, upon receiving a new file, the cluster generation module 320 may be configured to determine whether one or more elements extracted from the new file correlate with at least one of a plurality of clusters. In response to determining that the one or more extracted elements does not correlate with the plurality of clusters, the cluster generation module 320 may generate a cluster that includes the new file. In some examples, the cluster may be generated based at least in part on the one or more elements extracted from the new file. In some embodiments, the cluster generation module 320 may be configured to add the generated cluster to the plurality of clusters. In some embodiments, the cluster generation module 320 may be configured to generate one or more overlapping clusters.

In some embodiments, the cluster generation module 320 determine that one or more extracted elements correlate with the plurality of clusters. As an example, the elements may be extracted from a new file during a prediction stage. In some examples, the cluster generation module 320 may identify a pre-existing cluster associated with the new file. The pre-existing cluster may be generated during a training stage. In some examples, the cluster generation module 320 may be configured to identify a classification of the one or more extracted elements.

In one embodiment, purity module 325 may be configured to determine a first level of purity for a first classification of files and a second level of purity for a second classification of files. In some examples, the first classification of files may be a first cluster of files and the second classification of files may be a second cluster of files. As explained above, the cluster generation module 320 may generate a plurality of clusters of files, each cluster having at least one file from a first plurality of files (e.g., training set of files received during a training stage). In some examples, the purity module 325 may receive the generated clusters from the cluster generation module 320. In some embodiments, the purity module 325 may be configured to determine the first level of purity associated with the first cluster based on a number of malicious files and a number of non-malicious files in the first cluster.

Figure 4:
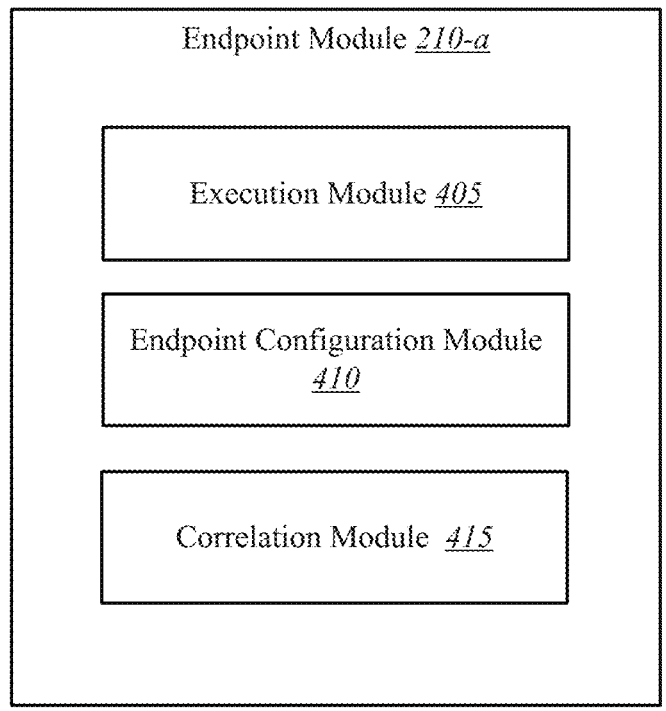
FIG. 4 is a block diagram illustrating one example of an endpoint module in accordance with various aspects of this disclosure.

FIG. 4 is a block diagram illustrating one example of an endpoint module 210-*a*. Endpoint module 210-*a* may be one example of endpoint module 210 depicted in FIG. 2. As depicted, endpoint module 210-*a* may include execution module 405, endpoint configuration module 410, and correlation module 415.

In one embodiment, the execution module 405 may be configured to identify a successful execution in relation to at least one of the plurality of files on an endpoint. In some embodiments, the execution module 405 may be configured to identify that a file successfully executes on the endpoint (i.e., a machine). In some examples, the execution module 405 may identify endpoints in relation to which a file was observed during a training stage. In some examples, the execution module 405 may observe that a file (e.g., a malicious file) was on the endpoint, or was observed being sent to or from the endpoint, where it successfully executes. For example, the execution module 405 may identify an endpoint which successfully detonates a malicious file. In some examples, the execution module 405 may determine that the endpoint environment satisfied the properties necessary for a malware to activate. In some embodiments, the execution module 405 may determine that a file labeled as malicious, fails to detonate in a particular endpoint. For example, the execution module 405 may determine receive files from computing device 150 described in FIG. 1. In some embodiments, the execution module 405 may be configured to identify successful execution of one or more malicious files, as part of a training stage.

In one embodiment, endpoint configuration module 410 may be configured to identify one or more properties associated with an endpoint. For example, the endpoint may be related to at least one of the plurality of files. In some examples, the endpoint configuration module 410 may receive an indication about an endpoint from the execution module 405. For example, the indication may relate to a malicious file that has successfully detonated in an endpoint. In some cases, the endpoint configuration module 410 may observe properties of endpoints for which there is evidence that a malicious file has displayed malicious behavior, indicating that the endpoint environment satisfied the properties necessary for the malware to activate. In some embodiments, the endpoint configuration module 410 may be configured to identify one or more properties associated with the endpoint based at least in part on a successful execution of a malicious file. In some examples, the endpoint configuration module 410 may be configured to identify one or more behavioral properties associated with the endpoint. In some cases, the one or more properties associated with the endpoint may include at least one of one or more processors, an operating system, a version associated with the operating system, a memory, a file system, device attributes, locale, geographic information, an input, a number of executing processes, details associated with the executing processes, a software installed on the endpoint, or a combination thereof.

In one embodiment, correlation module 415 may be configured to determine a correlation between the at least one extracted element and the one or more properties of the endpoint. In some examples, the correlation module 415 may be configured to determine a correlation between an identifier and properties associated with the endpoint. For example, the correlation module 415 may receive properties of an endpoint from the endpoint configuration module 410 and the correlation module 415 may determine the correlation based on the received properties. In some embodiments, the correlation module 415 may store the determined correlation in correlation data 165 in database 120. In some examples, the correlation module 415 may determine the correlation between one or more properties of an endpoint and an extracted element, during a training stage. In some examples, during a prediction stage, the correlation module 415 may receive updated information associated with one or more properties of an endpoint. Based on the updated information, the correlation module 415 may be configured to update a correlation between elements of a file and the updated information of the endpoint. In some examples, the correlation module 415 may determine a correlation between a plurality of clusters and one or more properties associated with the endpoints. The plurality of clusters may be generated using methods described in FIGS. 2 and 3.

Figure 5:
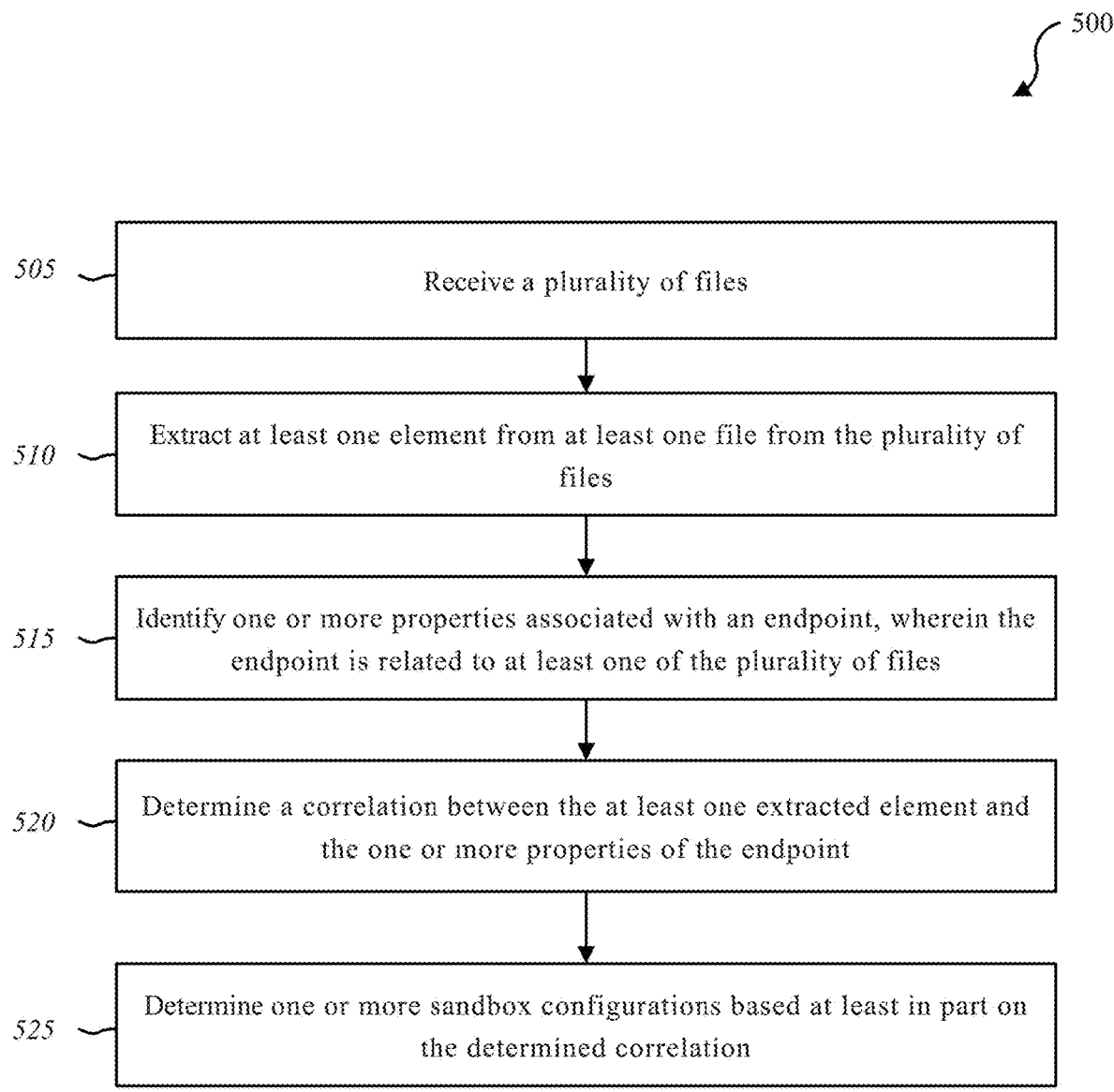
FIG. 5 is a flow diagram illustrating one embodiment of a method for determining sandbox configurations for malware analysis in accordance with various aspects of this disclosure.

FIG. 5 is a flow diagram illustrating one embodiment of a method 500 for determining sandbox configurations for malware analysis. In some configurations, the method 500 may be implemented by the sandbox configuration module 145 illustrated in FIGS. 1, 2, 3, and/or 4. In some configurations, the method 500 may be implemented in conjunction with the application 140 and/or the user interface 135 illustrated in FIG. 1.

At block 505, the method 500 may include receiving a plurality of files. At block 510, the method 500 may include extracting at least one element from at least one file from the plurality of files. At block 515, the method 500 may include identifying one or more properties associated with an endpoint. In some cases, the endpoint may be related to at least one of the plurality of files. At block 520, the method 500 may include determining a correlation between the at least one extracted element and the one or more properties of the endpoint. At block 525, the method 500 may include determining one or more sandbox configurations based at least in part on the determined correlation.

Figure 6:
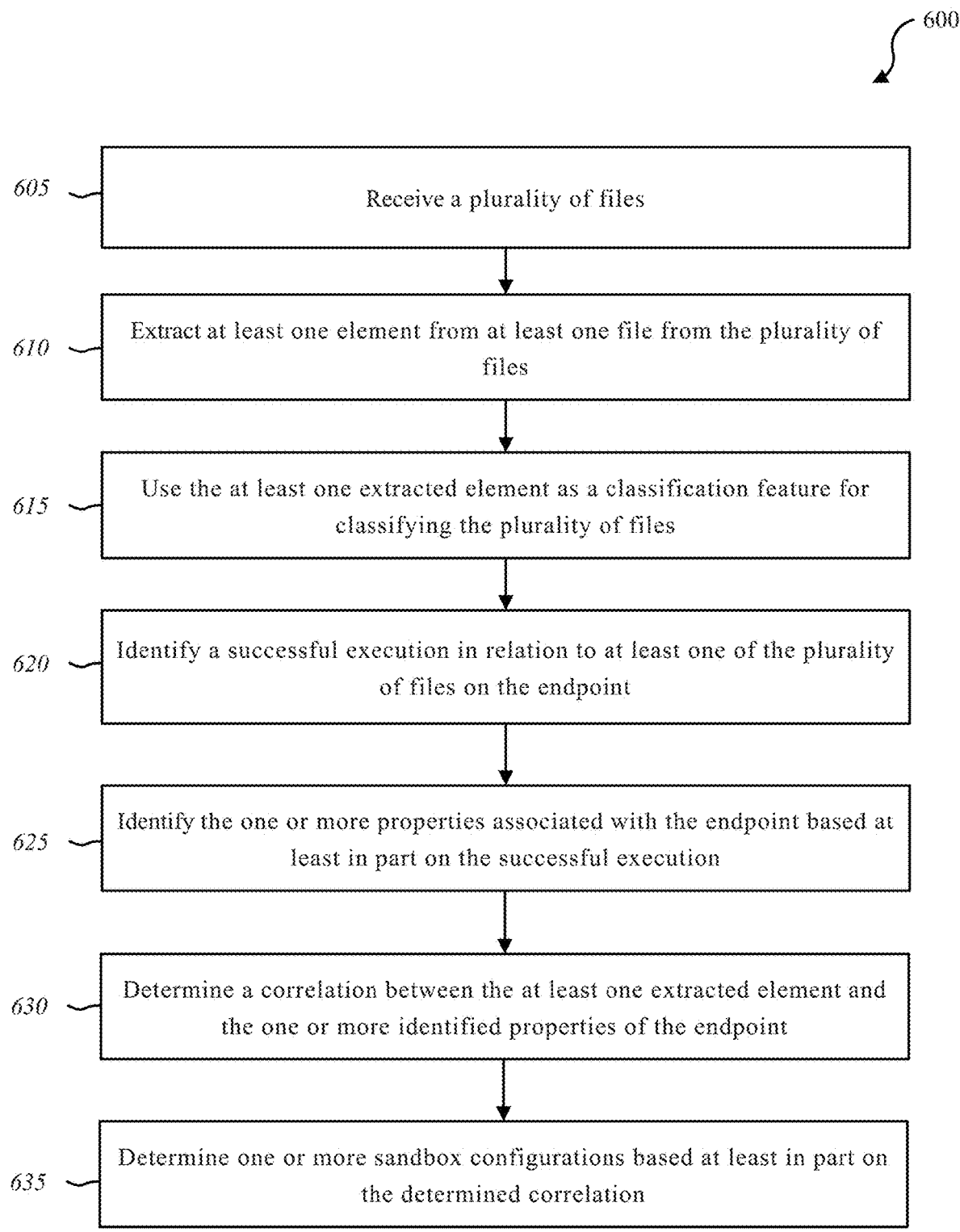
FIG. 6 is a flow diagram illustrating one embodiment of a method for determining sandbox configurations for malware analysis in accordance with various aspects of this disclosure.

FIG. 6 is a flow diagram illustrating one embodiment of a method 600 for determining sandbox configurations for malware analysis. In some configurations, the method 600 may be implemented by the sandbox configuration module 145 illustrated in FIGS. 1, 2, 3, and/or 4. In some configurations, the method 600 may be implemented in conjunction with the application 140 and/or the user interface 135 illustrated in FIG. 1.

At block 605, the method 600 may include receiving a plurality of files. At block 610, the method 600 may include extracting at least one element from at least one file from the plurality of files. At block 615, the method 600 may include using the at least one extracted element as a classification feature for classifying the plurality of files. At block 620, the method 600 may include identifying a successful execution in relation to at least one of the plurality of files on the endpoint. At block 625, the method 600 may include identifying the one or more properties associated with the endpoint based at least in part on the successful execution. At block 630, the method 600 may include determining a correlation between the at least one extracted element and the one or more identified properties of the endpoint. At block 635, the method 600 may include determining one or more sandbox configurations based at least in part on the determined correlation.

Figure 7:
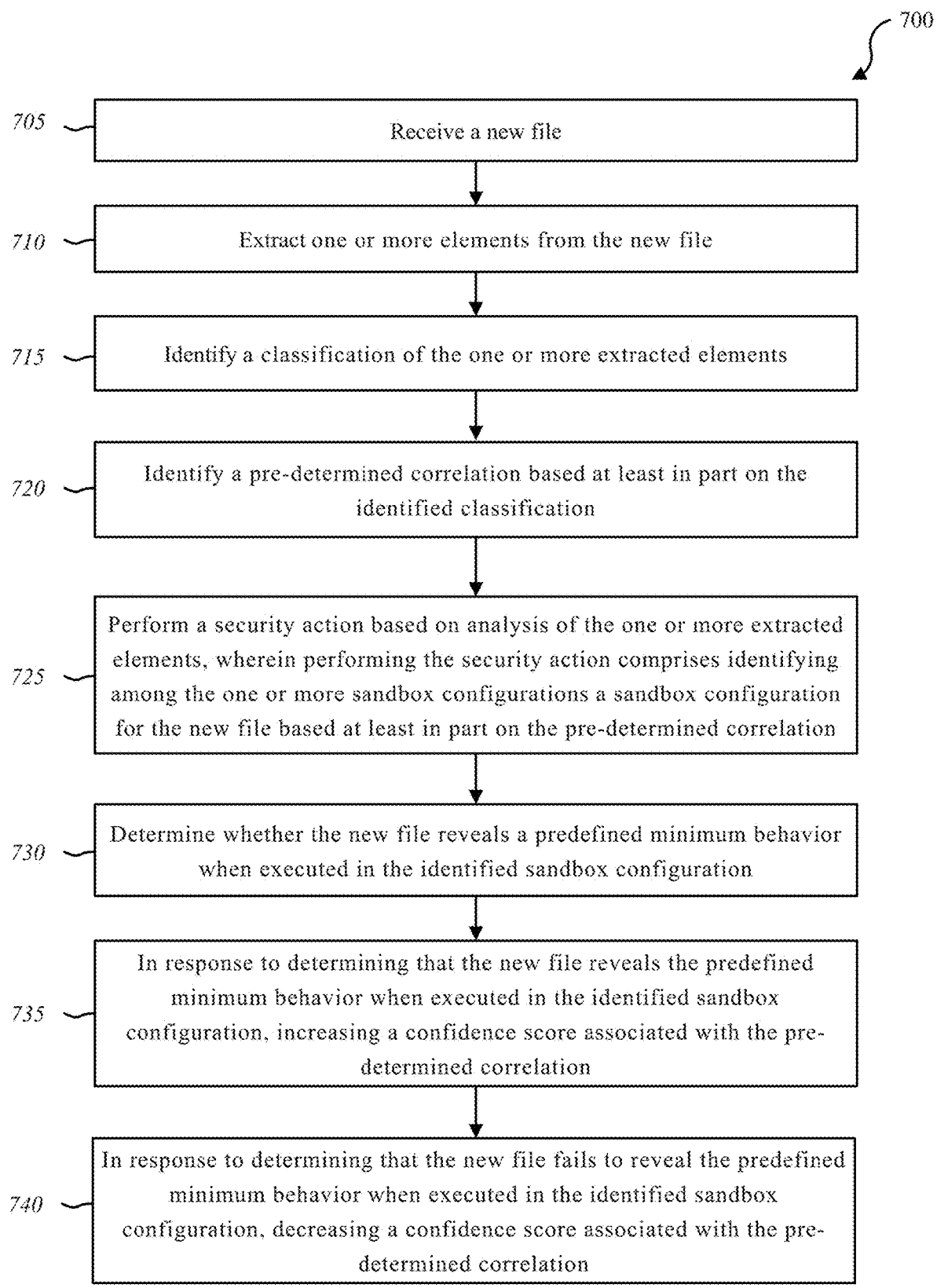
FIG. 7 is a flow diagram illustrating one embodiment of a method for determining sandbox configurations for malware analysis in accordance with various aspects of this disclosure.

FIG. 7 is a flow diagram illustrating one embodiment of a method 700 for determining sandbox configurations for malware analysis. In some configurations, the method 700 may be implemented by the sandbox configuration module 145 illustrated in FIGS. 1, 2, 3, and/or 4. In some configurations, the method 700 may be implemented in conjunction with the application 140 and/or the user interface 135 illustrated in FIG. 1.

At block 705, the method 700 may include receiving a new file. At block 710, the method 700 may include extracting one or more elements from the new file. At block 715, the method 700 may include identifying a classification of the one or more extracted elements. At block 720, the method 700 may include identifying a pre-determined correlation based at least in part on the identified classification. At block 725, the method 700 may include performing a security action based on analysis of the one or more extracted elements. In some cases, performing the security action may include identifying among the one or more sandbox configurations a sandbox configuration for the new file. In some cases, the sandbox configuration for the new file is based at least in part on the pre-determined correlation. At block 730, the method 700 may include determining whether the new file reveals a predefined minimum behavior when executed in the identified sandbox configuration. At block 735, the method 700 may include in response to determining that the new file reveals the predefined minimum behavior when executed in the identified sandbox configuration, increasing a confidence score associated with the pre-determined correlation. At block 740, the method 700 may include in response to determining that the new file fails to reveal the predefined minimum behavior when executed in the identified sandbox configuration, decreasing a confidence score associated with the pre-determined correlation.

Figure 8:
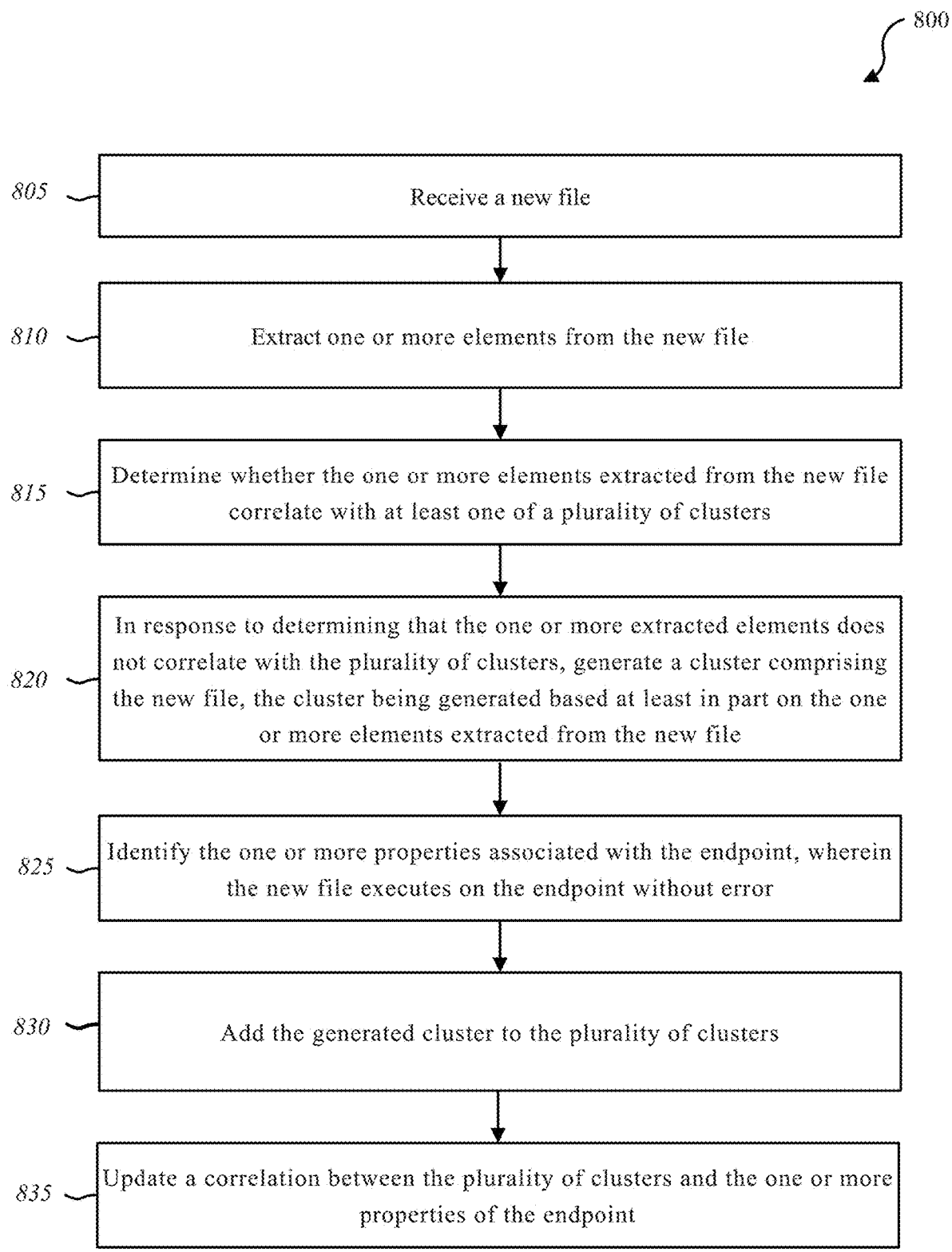
FIG. 8 is a flow diagram illustrating one embodiment of a method for determining sandbox configurations for malware analysis in accordance with various aspects of this disclosure.

FIG. 8 is a flow diagram illustrating one embodiment of a method 800 for determining sandbox configurations for malware analysis. In some configurations, the method 800 may be implemented by the sandbox configuration module 145 illustrated in FIGS. 1, 2, 3, and/or 4. In some configurations, the method 800 may be implemented in conjunction with the application 140 and/or the user interface 135 illustrated in FIG. 1.

At block 805, the method 800 may include receiving a new file. At block 810, the method 800 may include extracting one or more elements from the new file. At block 815, the method 800 may include determining whether the one or more elements extracted from the new file correlate with at least one of a plurality of clusters. At block 820, the method 800 may include, in response to determining that the one or more extracted elements does not correlate with the plurality of clusters, generating a cluster that includes the new file. In some cases, the cluster may be generated based at least in part on the one or more elements extracted from the new file. At block 825, the method 800 may include identifying the one or more properties associated with the endpoint. In some examples, the new file may reveals a predefined minimum behavior when executed on the endpoint. At block 830, the method 800 may include adding the generated cluster to the plurality of clusters. At block 835, the method 800 may include updating a correlation between the plurality of clusters and the one or more properties of the endpoint.

Figure 9:
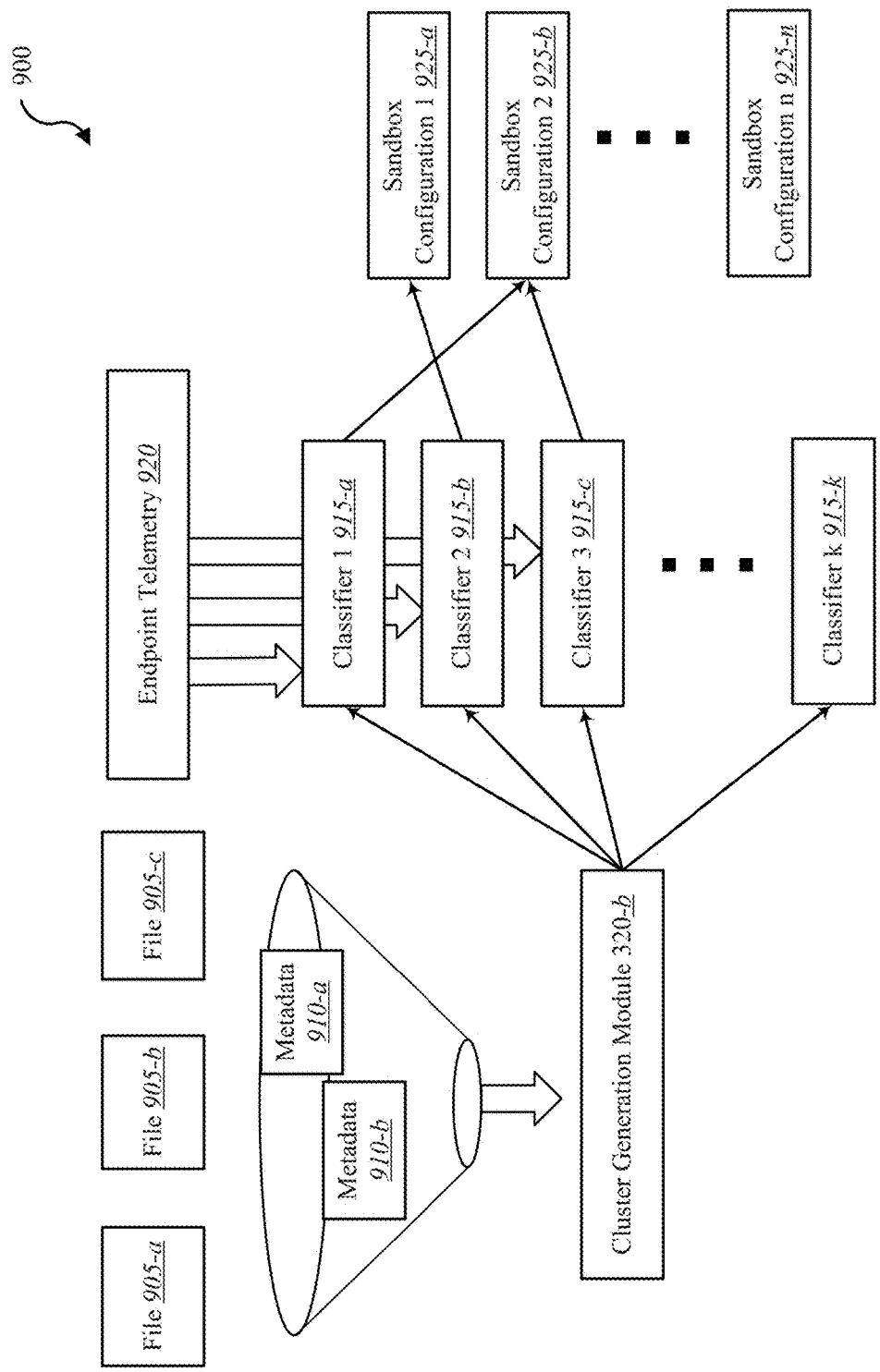
FIG. 9 is a block diagram illustrating one embodiment of an environment in which the present systems and methods may be implemented in accordance with various aspects of this disclosure.

FIG. 9 is a block diagram illustrating one embodiment of an environment 900 in which the present systems and methods may be implemented in accordance with various aspects of this disclosure. In some configurations, the systems and methods described herein may be implemented by the sandbox configuration module 145 illustrated in FIGS. 1, 2, 3, and/or 4. In some configurations, the method 900 may be implemented in conjunction with the application 140 and/or the user interface 135 illustrated in FIG. 1. As depicted, the environment 900 may include files 905, metadata 910, cluster generation 320-b, endpoint telemetry 920, classifiers 815, and a sandbox configurations 925.

The methods described in this figure relate to generating sample-specific sandbox configuration. As described herein files 905-a, 905-b, and 905-c may be received by a processor. In one example, files 905 are a training set of files. Metadata 910 may be extracted from the files 905 and may be inputted to the cluster generation module 320-b. The cluster generation module 320-b may classify the received metadata 910 using methods described with reference to FIGS. 2 and 3. Further, the clustering results are inputted to one or more classifiers 915. Endpoint telemetry 920 may be configured to identify indication of successful detonation of the files 905, at an endpoint. Upon identifying the properties of the endpoints, the classifiers 915 may determine a correlation between the properties and the extracted elements. As an example, the classifiers 915 may identify a correlation between properties of file 905-a and properties of the execution environment of file 905-a. The classifiers 915 may then identify one or more sandbox configurations 925 based at least in part on identifying the correlation.

Figure 10:
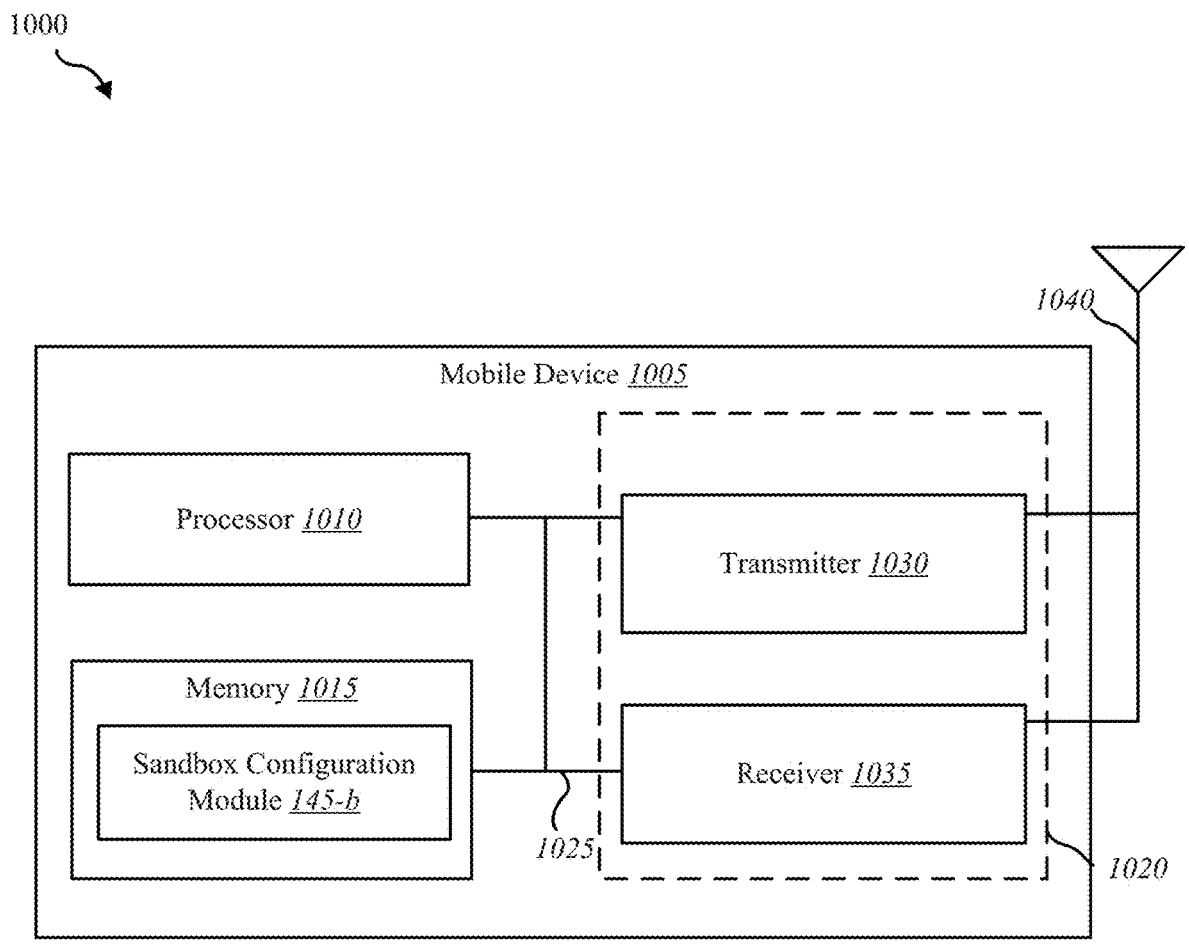
FIG. 10 depicts a block diagram of a computer system suitable for implementing the present systems and methods in accordance with various aspects of this disclosure.

FIG. 10 depicts a block diagram of a computer system 1000 suitable for implementing the present systems and methods. In one embodiment, the computer system 1000 may include a mobile device 1005. The mobile device 1005 may be an example of a device 105 depicted in FIG. 1. As depicted, the mobile device 1005 includes a bus 1025 which interconnects major subsystems of mobile device 1005, such as a central processor 1010, a system memory 1015 (typically RAM, but which may also include ROM, flash RAM, or the like), and a transceiver 1020 that includes a transmitter 1030, a receiver 1035, and an antenna 1040.

Bus 1025 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) or a Unified Extensible Firmware Interface (UEFI), which controls basic hardware operation such as the interaction with peripheral components or devices. For example, the sandbox configuration module 145-b to implement the present systems and methods may be stored within the system memory 1015. The sandbox configuration module 145-b may be one example of the sandbox configuration module 145 depicted in FIGS. 1 and/or 2. Applications resident with mobile device 1005 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 11:
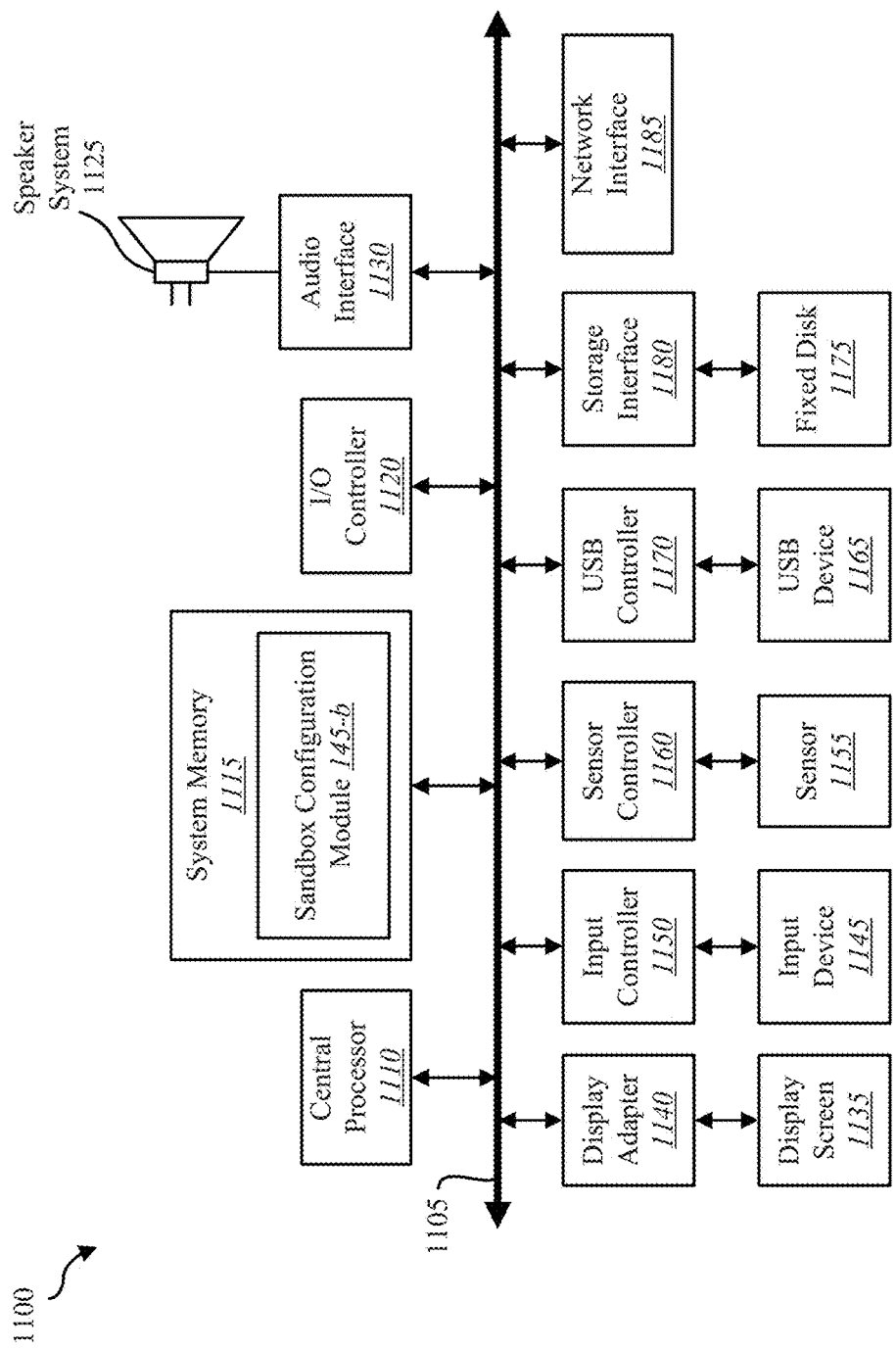
FIG. 11 depicts a block diagram of a computer system suitable for implementing the present systems and methods in accordance with various aspects of this disclosure.

FIG. 11 depicts a block diagram of a computer system 1100 suitable for implementing the present systems and methods. The device 1100 may be an example of device 105, computing device 150, and/or server 110 illustrated in FIG. 1. In one configuration, device 1100 includes a bus 1105 which interconnects major subsystems of device 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include ROM or flash memory (neither shown), and RAM (not shown), as previously noted. The RAM is generally the main memory into which the operating system and application programs are loaded. The ROM or flash memory can contain, among other code, the BIOS or the UEFI, which controls basic hardware operation such as the interaction with peripheral components or devices. For example, the sandbox configuration module 145-b to implement the present systems and methods may be stored within the system memory 1115. Applications (e.g., application 140) resident with device 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via interface 1185.

Storage interface 1180, as with the other storage interfaces of device 1100, can connect to a standard computer readable medium for storage and/or retrieval of information, such as a fixed disk drive 1175. Fixed disk drive 1175 may be a part of device 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on device 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 1100 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 1185 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 1120 may operate in conjunction with network interface 1185 and/or storage interface 1180. The network interface 1185 may enable system 1100 with the ability to communicate with client devices (e.g., device 105 of FIG. 1), and/or other devices over the network 115 of FIG. 1. Network interface 1185 may provide wired and/or wireless network connections. In some cases, network interface 1185 may include an Ethernet adapter or Fiber Channel adapter. Storage interface 1180 may enable system 1100 to access one or more data storage devices. The one or more data storage devices may include two or more data tiers each. The storage interface 1180 may include one or more of an Ethernet adapter, a Fiber Channel adapter, Fiber Channel Protocol (FCP) adapter, a SCSI adapter, and iSCSI protocol adapter.

Figure 12:
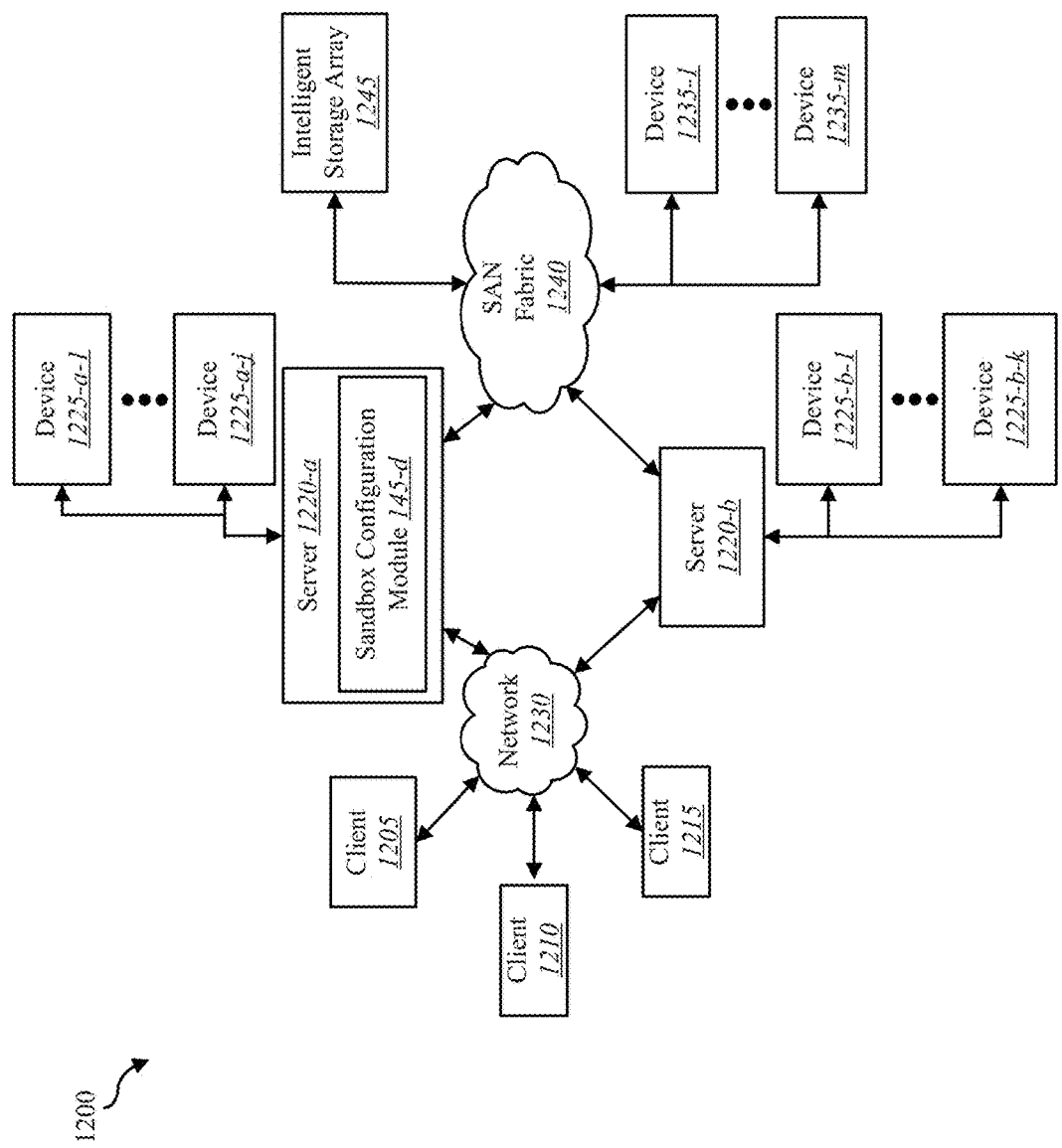
FIG. 12 is a block diagram depicting a network architecture in which client systems and storage servers may be coupled to a network in accordance with various aspects of this disclosure.

FIG. 12 is a block diagram depicting a network architecture 1200 in which client systems 1205, 1210 and 1215, as well as storage servers 1220-a and 1220-b (any of which can be implemented using computer system 1000 and/or 1100), are coupled to a network 1230. In one embodiment, the sandbox configuration module 145-d may be located within one of the storage servers 1220-a, 1220-b to implement the present systems and methods. The sandbox configuration module 145-d may be one example of the sandbox configuration module 145 depicted in FIGS. 1, 2, 3, 4, 6, and/or 7. The storage server 1220-a is further depicted as having storage devices 1225-a-1 through 1225-a-j directly attached, and storage server 1220-b is depicted with storage devices 1225-b-1 through 1225-b-k directly attached. SAN fabric 1240 supports access to storage devices 1235-l through 1235-m by storage servers 1220-a and 1220-b, and so by client systems 1205, 1210 and 1215 via network 1230. Intelligent storage array 1245 is also shown as an example of a specific storage device accessible via SAN fabric 1240.

With reference to computer system 1100, network interface 1185 or some other means or method can be used to provide connectivity from each of client computer systems 1205, 1210 and 1215 to network 1230. With reference to computer system 1000, transceiver 1020 or some other means or method can be used to provide connectivity from each of client computer systems 1205, 1210 and 1215 to network 1230. Client systems 1205, 1210 and 1215 are able to access information on storage server 1220-a or 1220-b using, for example, a web browser or other client software (not shown). Such a client allows client systems 1205, 1210 and 1215 to access data hosted by storage server 1220-a or 1220-b or one of storage devices 1225-a-1 through 1225-a-j, 1225-b-1 through 1225-b-k, 1235-l through 1235-m, or intelligent storage array 1245. FIG. 12 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for determining sandbox configurations for malware analysis on a computer system, comprising:
   receiving via one or more processors, a plurality of files;
   extracting via the one or more processors, at least one element from at least one file from the plurality of files;
   identifying via the one or more processors, one or more properties associated with an endpoint, wherein the endpoint is related to at least one of the plurality of files;
   determining via the one or more processors, a correlation between the at least one extracted element and the one or more properties of the endpoint by identifying an association between one or more of an execution environment and behavioral information of the at least one extracted element and the one or more properties of the endpoint; and
   determining via the one or more processors, one or more sandbox configurations based at least in part on the association between one or more of the execution environment and the behavioral information of the at least one extracted element and the one or more properties of the endpoint, wherein the one or more sandbox configurations includes the one or more properties associated with the endpoint.

2. The method of claim 1, comprising:
   identifying a successful execution in relation to at least one of the plurality of files on the endpoint; and
   identifying the one or more properties associated with the endpoint based at least in part on the successful execution.

3. The method of claim 1, comprising:
   using the at least one extracted element as a classification feature for classifying the plurality of files.

4. The method of claim 1, comprising:
   receiving a new file;
   extracting one or more elements from the new file; and
   performing a security action based on analysis of the one or more extracted elements, wherein performing the security action comprises identifying among the one or more sandbox configurations a sandbox configuration for the new file based at least in part on a pre-determined correlation.

5. The method of claim 4, comprising:
   identifying a classification of the one or more extracted elements; and
   identifying the pre-determined correlation based at least in part on the identified classification.

6. The method of claim 4, comprising:
   determining whether the new file reveals a predefined minimum behavior when executed in the identified sandbox configuration;
   in response to determining that the new file reveals the predefined minimum behavior when executed in the identified sandbox configuration, increasing a confidence score associated with the pre-determined correlation.

7. The method of claim 6, comprising:
   in response to determining that the new file fails to reveal the predefined minimum behavior when executed in the identified sandbox configuration, decreasing the confidence score associated with the pre-determined correlation.

8. The method of claim 1, comprising:
   receiving a new file;
   extracting one or more elements from the new file; and
   determining whether the one or more elements extracted from the new file correlate with at least one of a plurality of clusters.

9. The method of claim 8, comprising:
   in response to determining that the one or more extracted elements does not correlate with the plurality of clusters:
     generating a cluster comprising the new file, the cluster being generated based at least in part on the one or more elements extracted from the new file; and
     identifying the one or more properties associated with the endpoint, wherein the new file reveals a predefined minimum behavior when executed on the endpoint.

10. The method of claim 9, comprising:
    adding the generated cluster to the plurality of clusters; and
    updating a correlation between the plurality of clusters and the one or more properties of the endpoint.

11. The method of claim 8, comprising:
    in response to determining that the one or more extracted elements correlates with the plurality of clusters:
      identifying a pre-existing cluster associated with the new file;
      identifying a pre-determined correlation based at least in part on the pre-existing cluster; and
      identifying among the one or more sandbox configurations, wherein a sandbox configuration for the new file is based at least in part on the pre-determined correlation.

12. The method of claim 1, wherein the extracting comprises:
    parsing each file in the plurality of files to identify the at least one element from each file.

13. The method of claim 1, wherein the one or more properties associated with the endpoint includes at least one of one or more processors, an operating system, a version associated with the operating system, a memory, a file system, device attributes, locale, geographic information, an input, a number of executing processes, details associated with the executing processes, a software installed on the endpoint, or a combination thereof.

14. A computing device for determining sandbox configurations for malware analysis, comprising:
    one or more processors;
    memory in electronic communication with the one or more processors, wherein the memory stores computer executable instructions that when executed by the one or more processors cause the one or more processors to perform the steps of:
    receiving a plurality of files;
    extracting at least one element from at least one file from the plurality of files;

identifying one or more properties associated with an endpoint, wherein the endpoint is related to at least one of the plurality of files;

determining via the one or more processors, a correlation between the at least one extracted element and the one or more properties of the endpoint by identifying an association between one or more of an execution environment and behavioral information of the at least one extracted element and the one or more properties of the endpoint; and determining via the one or more processors, one or more sandbox configurations based at least in part on the association between one or more of the execution environment and the behavioral information of the at least one extracted element and the one or more properties of the endpoint, wherein the one or more sandbox configurations includes the one or more properties associated with the endpoint.

15. The apparatus of claim 14, wherein the instructions executed by the one or more processors cause the one or more processors to perform the steps of:

identifying a successful execution in relation to at least one of the plurality of files on the endpoint; and identifying the one or more properties associated with the endpoint based at least in part on the successful execution.

16. The apparatus of claim 14, wherein the instructions executed by the one or more processors cause the one or more processors to perform the steps of:

using the at least one extracted element as a classification feature for classifying the plurality of files.

17. The apparatus of claim 14, wherein the instructions executed by the one or more processors cause the one or more processors to perform the steps of:

receiving a new file;

extracting one or more elements from the new file; and performing a security action based on analysis of the one or more extracted elements, wherein performing the security action comprises identifying among the one or more sandbox configurations a sandbox configuration for the new file based at least in part on a pre-determined correlation.

18. The apparatus of claim 17, wherein the instructions executed by the one or more processors cause the one or more processors to perform the steps of:

identifying a classification of the one or more extracted elements; and identifying the pre-determined correlation based at least in part on the identified classification.

19. A non-transitory computer-readable storage medium storing computer executable instructions that when executed by one or more processors cause the one or more processors to perform the steps of:

receiving a plurality of files;

extracting at least one element from at least one file from the plurality of files;

identifying one or more properties associated with an endpoint, wherein the endpoint is related to at least one of the plurality of files;

determining via the one or more processors, a correlation between the at least one extracted element and the one or more properties of the endpoint by identifying an association between one or more of an execution environment and behavioral information of the at least one extracted element and the one or more properties of the endpoint; and determining via the one or more processors, one or more sandbox configurations based at least in part on the association between one or more of the execution environment and the behavioral information of the at least one extracted element and the one or more properties of the endpoint, wherein the one or more sandbox configurations includes the one or more properties associated with the endpoint.

20. The computer-program product of claim 19, wherein the instructions executed by the one or more processors cause the one or more processors to perform the steps of:

identifying a successful execution in relation to at least one of the plurality of files on the endpoint; and identifying the one or more properties associated with the endpoint based at least in part on the successful execution.

* * * * *